United States Patent Office 3,609,942
Patented Oct. 5, 1971

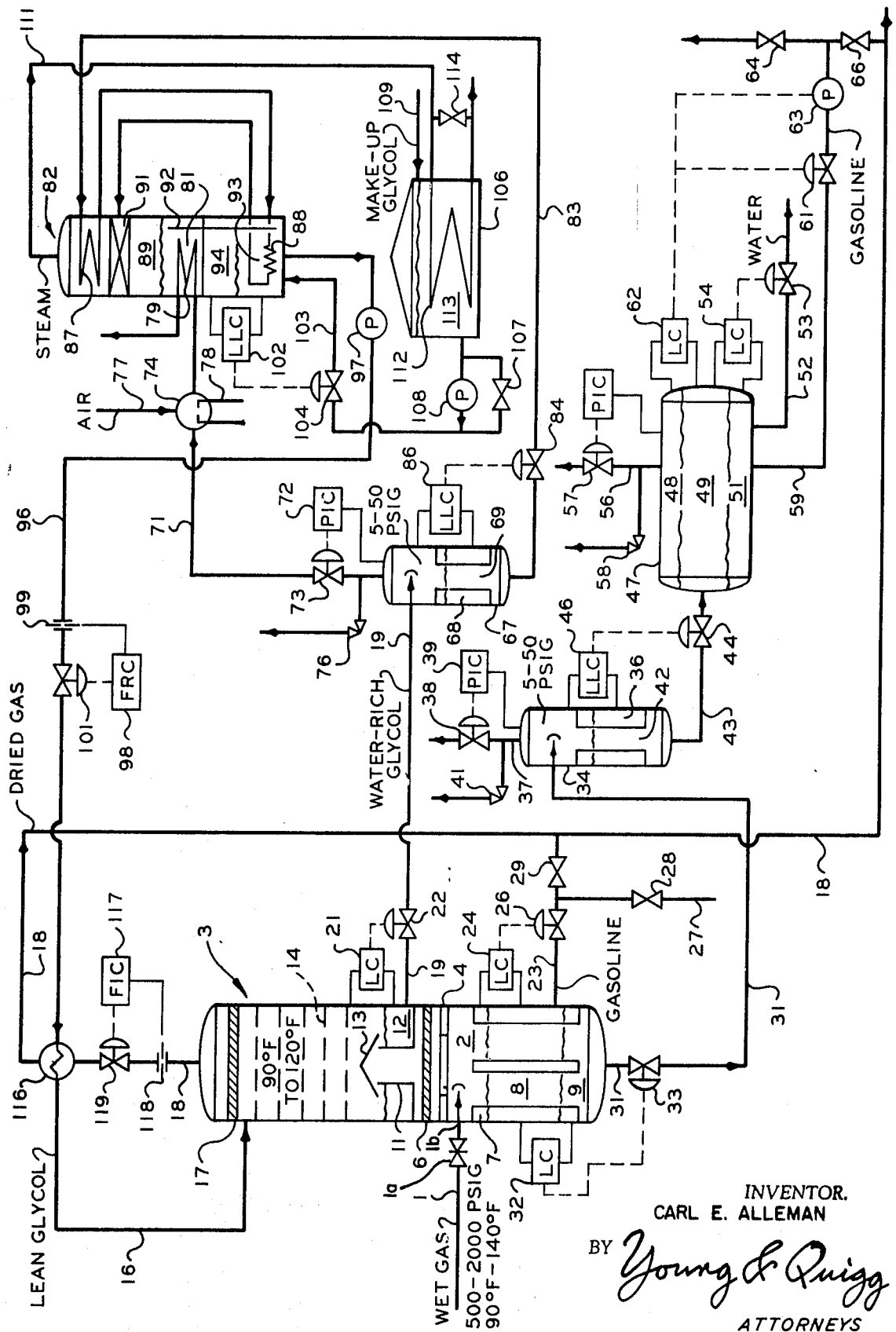

3,609,942
HIGH PRESSURE GAS DEHYDRATION WITH LIQUID DESICCANT
Carl E. Alleman, Bartlesville, Okla., assignor to
Phillips Petroleum Company
Filed Sept. 18, 1968, Ser. No. 760,581
Int. Cl. B01d *53/14*
U.S. Cl. 55—31                      7 Claims

ABSTRACT OF THE DISCLOSURE

Process and apparatus for dehydrating wet, high-pressure, essentially hydrocarbon gas with liquid desiccant in a conventional desiccant-contacting and desiccant-regenerating cycle, in which a drop in gas pressure occurs in a separator having a vertical axis cylindrical portion into which the wet gas is injected tangentially and horizontally with a lower noncylindrical portion to dampen swirling of the separated liquid. There may be controls on the gas and liquid outlets of the separator and heat exchange between the steam from the desiccant regenerator and the make-up desiccant. Hydrocarbon gas flashing from the liquid in a separator may be used as fuel for heating and regenerating the liquid desiccant. Hydrocarbon liquids separated in the process can be added to the dried gas after dehydration of the gas.

FIELD OF THE INVENTION

This invention relates to class 55, Gas Separation, subclass 32, Processes, Water From Gas by Sorptive Agent and Regenerating of Agent.

DESCRIPTION OF THE PRIOR ART

Contactor and separator tower 3 is somewhat similar to tower 1 of U.S. Pat. 2,428,643 to Young patented Oct. 7, 1947, originally classified in class 183, subclass 120 (class now abolished). Packed desiccant regeneration tower 82 is somewhat similar to tower 39 of U.S. Pat. 3,254,473 to Fryar et al. patented June 7, 1966, originally classified in class 55, subclass 32. Class 55, subclass 32 was searched. Other patents found were 2,812,827; 3,182,- 434; 3,348,601 and 3,370,636, but obviously they were not very pertinent. The combination with degasifying pots 34 and 67 is believed to be novel.

SUMMARY OF THE INVENTION

Process and apparatus for dehydrating wet, high-pressure, essentially hydrocarbon gas with liquid desiccant in a conventional desiccant-contacting and desiccant-regenerating cycle, in which a drop in gas pressure occurs in a separator having a vertical axis cylindrical portion into which the wet gas is injected tangentially and horizontally with a lower noncylindrical portion to dampen swirling of the separated liquid. There may be controls on the gas and liquid outlets of the separator and heat exchange between the steam from the desiccant regenerator and the make-up desiccant. Hydrocarbon gas flashing from the liquid in a separator may be used as fuel for heating and regenerating the liquid desiccant. Hydrocarbon liquids separated in the process can be added to the dried gas after dehydration of the gas.

It should be noted that cylindrical tanks 2, 34 and 67 have tangential inlets 1b, 31 and 19, and vertical, radial, internal vanes 7, 36 and 68 to still the whirling of liquids 8, 9, 42 and 69. Also, note that gas in 71 flashed from separator 67 is mixed with air 77 in burner 74 and burned in coil 79 to heat liquid desiccant 81 in regenerator 82. Steam 111 from regenerator 82 may be used in coil 112 to heat the make-up liquid desiccant in tank 113. Light liquid hydrocarbons separated in 2 can be added to the dried gas in line 18 if desired through line 23 and valve 29 for transport to shore in pipe line 18. Hydrocarbon 59 can also be pumped at 63 into line 18 if desired.

BRIEF DESCRIPTION OF THE DRAWINGS

The single figure of the drawing is a schematic process flowsheet showing the preferred form of a high pressure gas dehydrator embodying the present invention as designed for use on a gas well platform in the North Sea.

DESCRIPTION OF THE PREFERRED EMBODIMENT

In the North Sea there are gas well platforms where wet gas and contained liquids are produced from wells through a line 1. This invention can handle wet gas from line 1 at about 500 to 2000 p.s.i.g. Actually, the present gas pressure at one such platform from the upper Bunter and lower Bunter sands is about 1800 p.s.i.g., and it is intended to operate for several years with the present equipment, at least until the pressure falls below 700 p.s.i.g., when some reconsideration may take place to see what to do next. The equipment shown in the drawing is all mounted on the off-shore platform (not shown). The equipment shown will handle from about 100 million s.c.f.d. (standard cubic feet of gas per day, which is calculated as if at 60° F. and 30 inches of mercury absolute pressure) down to about 10 million s.c.f.d. At present, about 50 million s.c.f.d. is expected and the flow may be at about 20 million s.c.f.d. when the pressure finally drops to about 700 p.s.i.g.

As examples, the actual gas compositions in this region are given in Table 1:

TABLE 1

|  | Formation | |
| --- | --- | --- |
|  | Upper bunter | Lower bunter |
| Gas compositions, mol percent: |  |  |
| Helium | 0.07 | 0.03 |
| Carbon dioxide | 0.09 | 0.04 |
| Nitrogen | 8.62 | 2.24 |
| Methane | 82.17 | 91.38 |
| $C_2$ | 5.50 | 3.64 |
| $C_3$ | 2.50 | 0.88 |
| $iC_4$ | 0.24 | 0.16 |
| $nC_4$ | 0.15 | 0.25 |
| $iC_5$ | 0.04 | 0.12 |
| $nC_5$ | 0.02 | 0.12 |
| $C_6$ | 0.14 | 0.21 |
| $C_7+$ | 0.46 | 0.93 |
|  | 100.00 | 100.00 |
| Volume/volume: |  |  |
| Organic sulfur, p.p.m | 0.35 | 0.45 |
| $H_2S$, p.p.m | 530 | Nil |

NOTES.—Both gases are water saturated at about 132° F. and 700 p.s.i.g. Liquid hydrocarbons in both gases amount to about 11.4 bbls./million s.c.f. of gas.

This wet gas and contained liquids from line 1 is passed through an inlet means 1b disposed to inject them tangentially into a lower cylindrical gas and liquid separating chamber 2 in the lower part of contactor and separator tower 3. The inlet means may also include a pressure reducing valve 1a. The wet gas and contained liquids swirl around chamber 2 below an annular internal horizontal baffle 4 which is effective in keeping the liquid portion below it and out of mist-extracting screen 6. This liquid moves down helically on the inner surface of chamber 2 until it strikes vertical, radial, internal baffles 7 which substantially stops the helical movement and forms a pool in the bottom of chamber 2. This pool quickly undergoes phase separation into a light hydrocarbon liquid or gasoline layer 8, floating on an aqueous phase or water layer 9.

The advantage of the tangential entry of gas containing liquid, or liquid containing gas, in cylindrical chambers 2, 34 and 67 is that the thin film of liquid moving helically down the wall of the chamber allows rapid evolution of gas from the liquid under the reduced pressure, and the advantage of the vertical vanes 7, 36 and 68 is that they rapidly stop the whirling of the liquid and allow its withdrawal with more accurate liquid level control than if it were still whirling.

The wet gas, separated from the liquids 8 and 9 formerly contained therein, passes up tower 3 through a horizontally-disposed mist extractor screen 6 which removes entrained droplets of liquid, passing through chimney 11 (which form a liquid draw-off tray 12) and passing under hood 13 into the bubble trays 14. In the bubble trays 14 the wet gas passes at about 90–120° F. countercurrent to the lean desiccant entering tower 3 through line 16, forming dried gas, which passes through a second mist extractor screen 17 and out the top of the column through line 18, and also forming water-rich desiccant which collects in liquid draw-off tray 12 and is drawn off through line 19 in response to its liquid level by liquid level control 21. Control 21 opens and closes valve 22 to maintain a liquid level below the top of chimney 11 and thereby keep the desiccant out of lower chamber 2.

Some reduction in pressure takes place in chamber 2 and also in chambers 34 and 67.

Any suitable liquid desiccant may be employed in line 16. While ethylene glycol is preferred, diethylene glycol, triethylene glycol and other glycols may be used. Normal butyl alcohol, isobutyl alcohol, methyl carbitol and other alcohols may be used. This discussion of desiccants is taken from column 6 of U.S. Pat. 3,254,473 cited.

The separated liquid hydrocarbons 8 are drawn off through line 23 responsive to liquid level control 24 opening valve 26 to maintain a liquid level in chamber 2 and, of course, could remain separated by being withdrawn through line 27 with valve 28 open and valve 29 closed. However, in the actual off-shore installation there is only one pipe line 18 running to shore, so the liquid hydrocarbons 8 minus the water 9 with valve 28 closed and valve 29 open is dumped into line 18 and blown ashore therethrough by the dried gas. This may seem somewhat inefficient in that such minor amount of water as may be entrained in the liquid hydrocarbons 8 may get back in the dried gas. These hydrocarbons 8 may then be separated from the gas on shore (not shown), but this small amount of water will remain gaseous and for some uses of the gas need not be separated at all.

The separated water 9 from tower 2 is withdrawn through bottom line 31 in response to liquid level control 32 opening drain valve 33 to maintain a liquid level in chamber 2. As the water passes through pipe 31 and valve 33 from chamber 2 tangentially into cylindrical degasifying pot 34, the pressure drops from the high pressure of 500 to 2000 p.s.i.g. in tower 3 to 5 to 50 p.s.i.g. in pot 34. The water from 31 swirls down helically in pot 34 until it is stilled by vertical, radially-disposed, internal baffles 36 similar to baffles 7 in chamber 2. Gas contained in the water flashes out in the pressure reduction and is vented to the atmosphere or otherwise removed at a predetermined pressure through line 37 and valve 38 controlled by pressure-indicating controller 39. If the pressure should rise by several pounds per square inch over this pressure, then pressure relief valve 41 will also open. The water 42 collected in pot 34 is removed through line 43 as drain valve 44 is opened and closed by liquid level control 46 to maintain a level in pot 34.

Although there was a separation made in chamber 2 between light liquid hydrocarbons 8 and water 9, there may be small amounts of hydrocarbons left in water 42 in pot 34, so line 43 discharges into a liquid hydrocarbon-water separator 47 where it forms gas layer 48, liquid hydrocarbon layer 49 and water layer 51. By this time, water 51 is free enough from hydrocarbons so that it can be removed through line 52 and valve 53 controlled by liquid level control 54 and dumped in the sea, or on land, wherever it is easiest to dispose of it. There should not be much gas 48, and it can be vented to the atmosphere, or otherwise removed, through line 56 and relief valves 57 and 58 similar to parts 37, 38, 39 and 41. The relatively small amount of liquid hydrocarbon 49 that accumulates is removed through line 59 and valve 61 controlled by liquid level control 62 and is pumped by pump 63, also controlled to operate when valve 61 is open, to either pass through valve 66 into pipe line 18 running ashore or through valve 64 into a storage tank (not shown) from which it can be passed into the tanks of a tank ship (not shown) at intervals, and thus removed. Because of the original separation of light liquid hydrocarbons from chamber 2 through line 23, the hydrocarbons in layer 49 will accumulate very slowly, so removal by ship through valve 64 is about as practical as putting it in the gas pipe line 18.

The water-rich desiccant in line 19 is reduced in pressure from 500 to 2000 p.s.i.g. in tray 12 to 5 to 50 p.s.i.g. in degasifying pot 67. Line 19 discharges tangentially into cylindrical pot 67 and the liquid desiccant travels helically down the wall until it strikes vertical, radial, internal baffles 68 forming a pool of liquid 69. Gas which was dissolved in the liquid at high pressure flashes out as gas in the lower pressure in pot 67; and as it is mainly methane (see Table 1 above), it is passed through line 71 at a predetermined pressure set by pressure-indicating controller 72 and valve 73 into burner 74 as fuel. If the gas pressure in 67 rises several pounds per square inch above the setting of controller 72, then pressure relief valve 76 also opens, venting the excess gas to atmosphere.

Air is added to or drawn into burner 74 through line 77 and electric spark, or other ignition, may be applied at 78 to light the resulting combustion mixture. The burning mixture passes through coil 79 to heat the liquid desiccant 81 in desiccant regenerator tower 82. This is a novel source of fuel for heating tower 82, not shown by the prior art.

The water-rich desiccant 69 with gas removed passes out the bottom of pot 67 into line 83 through drain valve 84 controlled by liquid level control 86.

Then, somewhat as in tower 39 of Fryar et al. 3,254,473, cited, the rich desiccant passes in indirect heat exchange with the top of present tower 82 inside coil 87, then in indirect heat exchange with the bottom of the tower inside coil 88, and then into the upper tower chamber 89 through packed column 91 to form a pool of liquid desiccant 81. The liquid desiccant in pool 81 overflows down tube 92 (not shown by Fryar et al.) to form pool 93 in lower chamber 94, by which time it is water-lean desiccant. This lean liquid desiccant 93 is removed from chamber 94 by line 96 and pump 97 which raises the pressure above the pressure in tower 3 at a fixed predetermined rate of flow set by flow rate controller 98 sensing the flow in line 96 at 99 and controlling valve 101. (This again is different than Fryar et al.)

A novel feature is that liquid level control 102 maintains a predetermined level of liquid desiccant 93 in chamber 94 regardless of whether the flow in through pipe 92 equals the flow out through pipe 96 by adding make-up amounts of new liquid desiccant through line 103 by controlling valve 104.

This make-up liquid desiccant is supplied from tank 106 to line 103 by gravity through valve 107 or through pump 108. Tank 106 may be filled through line 109.

As a novel feature and improvement, it has been found that steam stripped out of tower 82 through line 111 may be used in indirect heat exchange in coil 112 submerged in liquid desiccant 113 in tank 106 to keep the desiccant warm, so that its viscosity will remain low enough for easy flow by gravity in line 103 and easy pumping in pump 108. Without heater 112, the temperature of tank 113 would be approximately atmospheric, which would not be over 60° F. in the North Sea and might go below 30° F. The triethylene glycol has excessive viscosity below 60° F., and coil 112 easily keeps tank 113 above 60° F. even in the winter time. The temperature in coil 112 may be regulated by any means known to the prior art, such as by-passing some of the steam through valve 114 to lower the temperature in coil 112.

The major amount of the water in wet gas from line 1 is taken up by the lean desiccant from line 16 in tower 3 and removed as water-rich desiccant from tray 12. The water-rich desiccant loses its contained gas in degassifying pot 67 and has its water driven off as steam in line 111 from the top of desiccant regeneration tower 82. The hot lean liquid desiccant in line 96 is passed in indirect heat exchange in heat exchanger 116 with the dried gas in line 18 to cool the desiccant before it passes through pipe 16 into tower 3 (as in heat exchanger 2 of Young 2,428,643, cited). The rate at which dried gas passes through pipe 18 is controlled by flow-indicating controller 117 which measures flow at 118 and adjusts valve 119 to allow a predetermined rate of flow.

While one specific preferred embodiment of the invention has been disclosed for purposes of illustration, the invention is obviously not limited thereto.

Having described my invention, I claim:

1. An apparatus for liquid-gas separation comprising in combination:
   (a) a cylindrical tank having a vertical axis and having a top chamber which comprises a bubble column and a bottom chamber,
   (b) a tangential inlet means in the upper portion of the bottom chamber for admitting a liquid-gas mixture and injecting said liquid-gas mixture tangentially on the inner cylindrical surface of said bottom chamber in a horizontal direction,
   (c) a pressure reducing valve in said inlet means,
   (d) radially-disposed, internally-extending vertical vanes on the wall of said bottom chamber, but below said inlet means, for dampening the rotation of liquid on the walls of said bottom chamber,
   (e) a first liquid outlet means below the top of said vertical vanes,
   (f) a second liquid outlet means for heavier liquid below said first outlet means,
   (g) a horizontally-disposed, inwardly-extending annular baffle on the wall of the said cylindrical tank, above said inlet means to help prevent a flow of liquid upward from said bottom chamber into said top chamber,
   (h) a first mist extracting screen horizontally disposed above said annular baffle to remove liquid entrained in the gas rising above said annular baffle,
   (i) a solid barrier between said bottom chamber and said top chamber which also forms a liquid collection and draw-off tray,
   (j) a chimney extending through said barrier providing communication between said top chamber and said bottom chamber,
   (k) a hood over said chimney disposed so as to allow a gas rising from said bottom chamber to pass into said top chamber and prevent a downflowing liquid from entering said bottom chamber,
   (l) an outlet for liquid disposed between said barrier and the top of said chimney,
   (m) an outlet for gas in the upper portion said top chamber,
   (n) an inlet for liquid in the upper portion of said top bubble column chamber but below said outlet for gas, and
   (o) a second mist extracting screen for removing liquid entrained in the rising gas horizontally disposed between said outlet for gas and said inlet for liquid.

2. The apparatus of claim 1 in which there is a drain valve in the first outlet for liquid and liquid level control means disposed to maintain a liquid level in said tank by opening and closing said drain valve.

3. The apparatus of claim 1 in which there is a pressure relief valve in the outlet for gas.

4. The apparatus of claim 1 in which there is a drain valve in the second outlet for liquid and a liquid level control means disposed to maintain a second heavier liquid level in said tank below a first liquid level by opening and closing said drain valve.

5. The process of dehydrating a wet gas initially under high pressure comprising the steps:
   (a) reducing the pressure of the wet gas and separating therefrom some first liquid hydrocarbon and first water,
   (b) passing the wet gas in countercurrent contact with a stream of water-lean liquid desiccant to produce dried gas and water-rich liquid desiccant containing dissolved gas,
   (c) flashing said water-rich desiccant at a lower pressure to release some of said dissolved gas,
   (d) regenerating said water-rich desiccant by heating and driving off the water as steam,
   (e) burning said released gas to supply said heating,
   (f) using said driven-off steam to heat liquid desiccant that is to be added to the system to replace liquid desiccant lost in the process,
   (g) raising the pressure of said regenerated water-lean desiccant,
   (h) recycling the regenerated water-lean desiccant to the first step of countercurrent contact with a wet gas, and
   (i) separating said first liquid hydrocarbon from said first water.

6. The process of claim 5 in which the first liquid hydrocarbon is mixed into the produced dry gas for transport.

7. The process of claim 5 in which the first water separated is reduced in pressure and further separated into a second liquid water phase and a second liquid hydrocarbon phase, and said separated liquid hydrocarbon phase is mixed into said dry gas for transport.

References Cited

UNITED STATES PATENTS

| | | | |
|---|---|---|---|
| 1,107,803 | 8/1914 | Koppers | 55—88 |
| 2,106,589 | 1/1938 | Bigger et al. | 55—205 X |
| 2,428,643 | 10/1947 | Young | 55—32 |
| 2,750,331 | 6/1956 | Meyers. | |
| 3,213,593 | 10/1965 | Hendrix | 55—32 |
| 3,225,519 | 12/1965 | Stotler | 55—93 X |
| 3,236,029 | 2/1966 | Afdahl et al. | 55—89 X |
| 3,254,473 | 6/1966 | Fryar et al. | 55—32 |
| 3,349,548 | 10/1967 | Boyen | 55—459 X |
| 3,486,297 | 12/1969 | Eisinga et al. | 55—170 X |
| 3,488,927 | 1/1970 | Jepsen et al. | 55—261 X |
| 2,996,142 | 8/1961 | Worley | 55—31 |

REUBEN FRIEDMAN, Primary Examiner

C. N. HART, Assistant Examiner

U.S. Cl. X.R.

55—55, 176